US011218624B2

(12) United States Patent
Saito et al.

(10) Patent No.: US 11,218,624 B2
(45) Date of Patent: Jan. 4, 2022

(54) ACTUATOR DRIVER

(71) Applicants: ROHM CO., LTD., Kyoto (JP); Sony Semiconductor Solutions Corporation, Atsugi (JP)

(72) Inventors: Akihito Saito, Kyoto (JP); Tatsuya Ninomiya, Kyoto (JP); Nobuo Kohmura, Kyoto (JP); Kento Nishizawa, Kyoto (JP); Tatsuro Shimizu, Kyoto (JP); Takahiro Akahane, Atsugi (JP); Go Asayama, Atsugi (JP); Yuki Urano, Atsugi (JP)

(73) Assignees: ROHM CO., LTD., Kyoto (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/989,081

(22) Filed: Aug. 10, 2020

(65) Prior Publication Data

US 2020/0374428 A1  Nov. 26, 2020

Related U.S. Application Data

(63) Continuation of application No. PCT/JP2019/001774, filed on Jan. 22, 2019.

(30) Foreign Application Priority Data

Feb. 9, 2018 (JP) .............................. JP2018-022116

(51) Int. Cl.
*H04N 5/225* (2006.01)
*H04N 5/232* (2006.01)
*H04N 5/378* (2011.01)

(52) U.S. Cl.
CPC ......... *H04N 5/2253* (2013.01); *H04N 5/2254* (2013.01); *H04N 5/2257* (2013.01); *H04N 5/23212* (2013.01); *H04N 5/378* (2013.01)

(58) Field of Classification Search
None
See application file for complete search history.

(56) References Cited

U.S. PATENT DOCUMENTS

| 2011/0026149 A1* | 2/2011 | Fan .......................... G02B 7/08 359/824 |
| 2012/0086824 A1* | 4/2012 | Asakura ............. H04N 5/23258 348/208.99 |

(Continued)

FOREIGN PATENT DOCUMENTS

| JP | 2000295832 A | 10/2000 |
| JP | 2005331399 A | 12/2005 |

(Continued)

OTHER PUBLICATIONS

International Preliminary Report on Patentability; dated Aug. 11, 2020, with Written Opinion of the International Searching Authority; dated Jun. 16, 2019, for International Application No. PCT/JP2019/001774.

(Continued)

*Primary Examiner* — William B Perkey
(74) *Attorney, Agent, or Firm* — Cantor Colburn LLP

(57) ABSTRACT

An image sensor includes a pixel array including multiple pixels. A lens is provided on an optical path of incident light to the image sensor. An actuator includes a coil, and supports positioning of the lens according to a driving signal applied to the coil. A position detection coil is arranged such that it magnetically couples with the coil of the actuator. An actuator driver supplies a pulse-shaped driving signal to the coil of the actuator driver. A position detection circuit generates a position detection signal that indicates the position of the lens based on an induced electromotive force that occurs in the position detection coil according to the driving signal, and feeds back the position detection signal to the actuator driver.

9 Claims, 9 Drawing Sheets

(56) References Cited

U.S. PATENT DOCUMENTS

| | | | | |
|---|---|---|---|---|
| 2015/0130990 A1* | 5/2015 | Cho | .................... | H04N 5/2257 |
| | | | | 348/357 |
| 2015/0207983 A1* | 7/2015 | Kang | ................... | H04N 5/2254 |
| | | | | 348/349 |
| 2020/0374428 A1* | 11/2020 | Saito | .................... | H04N 5/2253 |

FOREIGN PATENT DOCUMENTS

| | | | |
|---|---|---|---|
| JP | 2011203074 A | 10/2011 | |
| JP | 2016537665 A | 12/2016 | |
| JP | 2018189703 A | 11/2018 | |
| WO | 2016158161 A1 | 10/2016 | |

OTHER PUBLICATIONS

International Search Report for International Application No. PCT/JP2019/001774; dated Apr. 16, 2019.

\* cited by examiner

ACTUATOR DRIVER

CROSS REFERENCE TO RELATED APPLICATIONS

This application is a continuation under 35 U.S.C. § 120 of PCT/JP2019/001774, filed Jan. 22, 2019, which is incorporated herein reference and which claimed priority to Japanese Application No. 2018-022116, filed Feb. 9, 2018. The present application likewise claims priority under 35 U.S.C. § 119 to Japanese Application No. 2018-022116, filed Feb. 9, 2018, the entire content of which is also incorporated herein by reference.

BACKGROUND

1. Technical Field

The present disclosure relates to an image acquisition apparatus.

2. Description of the Related Art

A camera module is mounted on various kinds of electronic devices such as smartphones, tablet PCs, etc. The camera module includes an image acquisition element such as a Complementary Metal Oxide Semiconductor (CMOS) sensor, Charge Coupled Device (CCD), or the like, an autofocus lens or an image stabilization lens, an actuator configured to move the lens, and a driver circuit for the actuator.

With conventional techniques, the lens is controlled using an open-loop method that does not execute lens position detection. In recent years, an increasing number of such camera modules have a function of detecting the lens position, and of controlling the lens position with high speed and high precision by feeding back the position information thus detected.

As a method for detecting the lens position, a method employing a Hall element is known. Specifically, a permanent magnet is mounted on a movable portion side. Furthermore, a Hall element is mounted on a stationary portion side. The Hall voltage generated by the Hall element changes according to the strength of the magnetic field received by the Hall element, i.e., the distance between the movable portion and the stationary portion. The driver of the actuator generates a position detection signal that indicates the lens position based on the Hall voltage. Furthermore, the driver changes a driving signal to be supplied to the actuator such that the position detection signal matches a target code that indicates the target position of the lens.

As described above, such an arrangement requires such a Hall element and permanent magnet to detect the lens position. This becomes a factor of an increased cost. Furthermore, this leads to difficulty in reducing the size of such a camera module.

SUMMARY

The present disclosure has been made in view of such a situation. An outline of several example embodiments of the disclosure follows. This outline is provided for the convenience of the reader to provide a basic understanding of such embodiments and does not wholly define the breadth of the disclosure. This outline is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later.

An embodiment relates to an image sensor (solid-state image acquisition device). The image sensor includes: a pixel array including multiple pixels arranged in an image acquisition area; and a position detection coil arranged in an area that surrounds the image acquisition area.

In a case in which a magnetic field generating unit is mounted on a movable unit configured to be displaced together with the lens, the induced electromotive force that occurs in the position detection coil changes according to the position of the lens. Accordingly, such an arrangement is capable of detecting the position of the lens using the induced electromotive force without using a Hall element. This allows the camera module to be configured with a reduced cost and a reduced size. Furthermore, in a case of employing a Hall element, such an arrangement involves problems due to temperature fluctuation or individual variation. In contrast, in a case of using the induced electromotive force, such an arrangement is capable of solving such problems.

Also, a lens may be provided on an optical path of incident light to the image sensor. Also, the image sensor may be configured to allow an induced electromotive force to occur in the position detection coil according to a magnetic field generated by a coil of an actuator structured to support positioning of the lens.

In a case in which the coil of the actuator is also employed as a magnetic field generating unit, such an arrangement does not require a permanent magnet, an additional coil that differs from the coil of the actuator, a driving unit for the additional coil, and the like. Accordingly, this allows the camera module to be configured with a further reduced cost and a further reduced size.

Also, the lens may be configured as an autofocus lens. In a case in which such an autofocus lens is controlled, the distance between the image acquisition face of the pixel array and the lens is employed as a measurement target. If the position detection coil is configured as an external component of the image sensor, this arrangement cannot avoid a problem of the occurrence of deviation in the relation between the position detection coil and the image acquisition face of the image sensor. Accordingly, such an arrangement requires high-precision alignment and an additional process such as calibration or the like at the manufacturing stage. In contrast, in a case in which the position detection coil is built into the image sensor, this arrangement ensures that the distance between the position detection coil and the image acquisition face is constant. This provides high-precision position detection.

Also, the image sensor may further include a readout control circuit structured to control the multiple pixels, and to read out pixel values from the multiple pixels. Also, the actuator may be pulse driven. Also, the readout control circuit may generate a transmission permission signal that indicates whether transition of a pulse-shaped driving signal to be supplied to the coil of the actuator is to be permitted or prohibited.

In a case in which the actuator is pulse driven, an AC component of the driving signal supplied to the coil of the actuator becomes radiation noise. In some cases, this leads to degraded image quality. With this embodiment, the transmission permission signal is used to notify the actuator driver of a period from among the control sequence of the readout control circuit in which degradation in image quality does not occur even if such radiation noise is input. By applying such a transition permission signal to the driving signal, this arrangement is capable of suppressing degradation in image quality.

Also, the image sensor may further include an actuator driver structured to pulse drive the actuator such that a position detection signal that indicates the position of the lens matches a position instruction signal that indicates the target position of the lens. Also, the actuator driver may control a pulse-shaped driving signal to be supplied to the actuator such that a transition occurs in the driving signal in a period in which the transmission permission signal indicates the permission for signal transition.

In a case in which the actuator driver is built into the image sensor, such an arrangement is capable of supporting the lens position control operation using only the image sensor.

Also, the image sensor may further include a position detection circuit structured to generate a position detection signal that indicates the position of the lens based on an induced electromotive force that occurs in the position detection coil. The induced electromotive force has a very small amplitude. Accordingly, the induced electromotive force is easily affected by noise. In a case in which the position detection circuit is built into the image sensor, such an arrangement allows the signal transmission distance to be reduced, thereby allowing the noise effects to be reduced.

Also, the pixel array and the position detection coil may be integrated on a first chip. Also, the readout control circuit may be integrated on a second chip having an upper face on which the first chip is mounted.

Another embodiment of the present disclosure relates to a camera module. The camera module includes: a pixel array including multiple pixels; a lens provided on an optical path of incident light to the image sensor; an actuator including a coil, and structured to support positioning of the lens according to a driving signal applied to the coil; a position detection coil arranged such that it magnetically couples with the coil of the actuator; an actuator driver structured to supply the pulse-shaped driving signal to the coil of the actuator; and a position detection circuit structured to generate a position detection signal that indicates the position of the lens based on an induced electromotive force that occurs in the position detection coil according to the driving signal, and to feed back the position detection signal to the actuator driver.

In a case in which the coil of the actuator is pulse driven, an induced electromotive force occurs in the position detection coil magnetically coupled with the actuator coil according to the distance between the two coils. Accordingly, such an arrangement is capable of detecting the lens position using the induced electromotive force without using a Hall element. This allows the camera module to be configured with a reduced cost and/or a reduced size. Furthermore, this reduces the effects of temperature fluctuation and individual variation, thereby allowing high-precision position detection.

Also, the position detection coil may be built into the image sensor.

This ensures that the position relation between the position detection coil and the image acquisition face is constant. Accordingly, this arrangement requires neither high-precision alignment of the position detection coil nor calibration processing.

Also, the image sensor may supply a transition permission signal that indicates whether transition of the driving signal is to be permitted or prohibited, in synchronization with an internal operation.

In a case in which the actuator is pulse driven, an AC component of the driving signal supplied to the coil of the actuator becomes radiation noise. In some cases, this leads to degraded image quality. With this embodiment, the transmission permission signal is used to notify the actuator driver of a period from among the control sequence of the readout control circuit in which degradation in image quality does not occur even if such radiation noise is input. By applying such a transition permission signal to the driving signal, this arrangement is capable of suppressing degradation in image quality.

Yet another embodiment of the present disclosure relates to an electronic device. The electronic device may include the camera module according to any one of the embodiments described above.

Yet another embodiment of the present disclosure relates to an actuator driver. The actuator driver is structured to drive an actuator structured to support positioning of a lens provided on an optical path of incident light to an image sensor. The actuator driver includes: an interface circuit structured to receive a position instruction signal that indicates the target position of the lens; a controller structured to generate a control pulse with at least one variable property from among a duty ratio, frequency, on time, and off time, which is changed such that the position instruction signal matches a position detection signal obtained based on an induced electromotive force that occurs in a position detection coil arranged such that it magnetically couples with a coil included in the actuator; and a driver unit structured to drive the actuator based on the control pulse.

In a case in which the coil of the actuator is pulse driven, an induced electromotive force occurs in the position detection coil magnetically coupled with the actuator coil according to the distance between the two coils. Accordingly, such an arrangement is capable of detecting the lens position using the induced electromotive force without using a Hall element. This allows the actuator driver to be configured with a reduced cost and/or a reduced size. Furthermore, this reduces the effects of temperature fluctuation and individual variation, thereby allowing high-precision position detection.

Also, the controller may be structured to receive, from the image sensor, a transition permission signal that indicates whether transition of the control pulse is to be permitted or prohibited, and to apply the transition permission signal to the control pulse.

It is to be noted that any arbitrary combination or rearrangement of the above-described structural components and so forth is effective as and encompassed by the present embodiments. Moreover, this summary of the disclosure does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
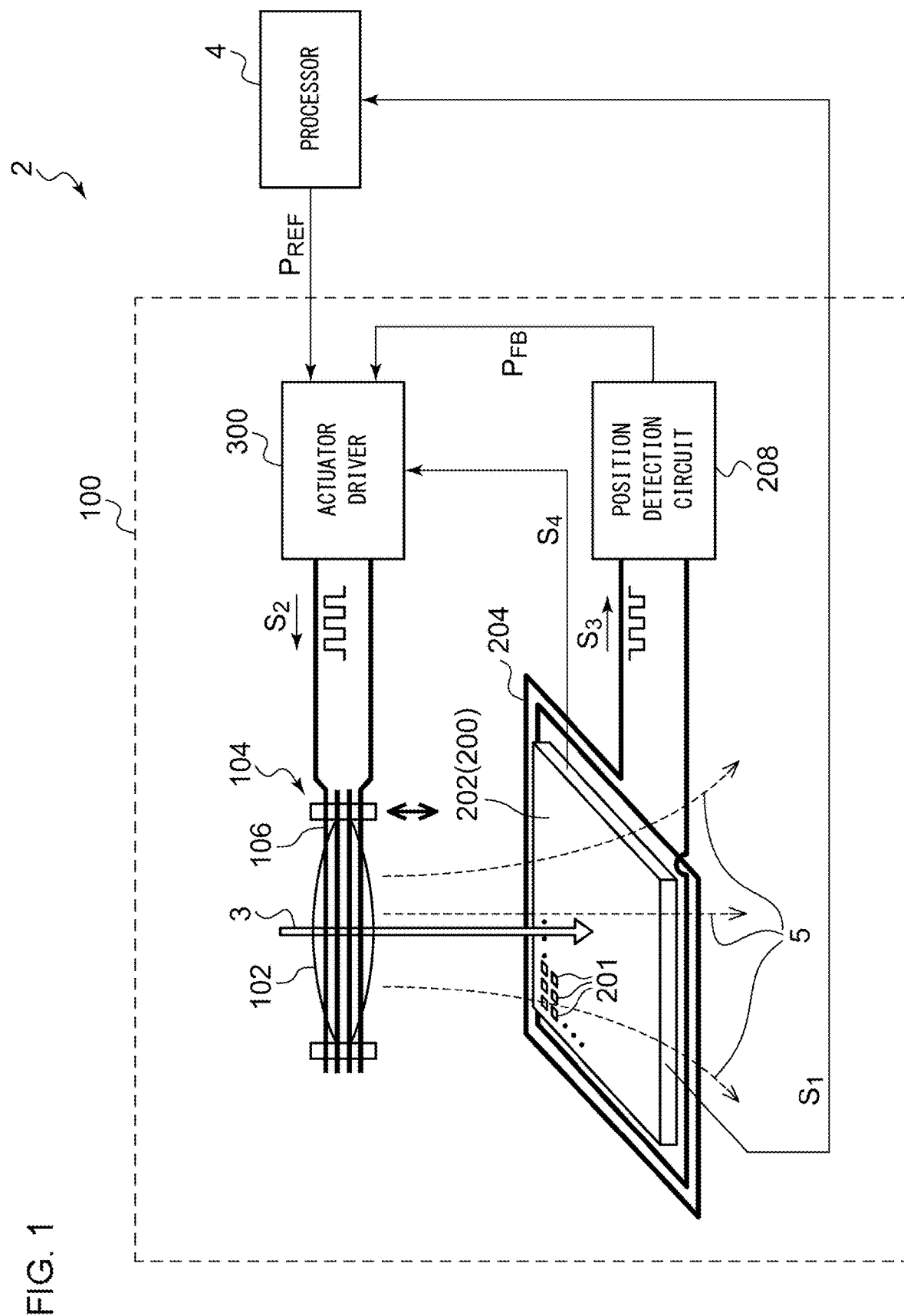
FIG. 1 is a block diagram showing a camera module according to an embodiment.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness that is larger than that of another member B in the drawings, in some cases, in actuality, the member A has a thickness that is smaller than that of the member B.

In the present specification, a state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

FIG. 1 is a block diagram showing a camera module 100 according to an embodiment. The camera module 100 is configured as an image acquisition apparatus built into an electronic device 2 such as a smartphone, tablet terminal, digital still camera, digital video camera, or the like.

The cameral module 100 includes an image sensor 200, a lens 102, an actuator 104, and an actuator driver 300.

The image sensor 200 includes a pixel array 202 including multiple pixels 201 arranged in a matrix. In the present embodiment, the image sensor 200 is configured as a CMOS sensor. Image data $S_1$ acquired by the image sensor 200 is supplied to an image processing processor 4.

The lens 102 is arranged on an optical path of incident light 3 to the pixel array 202 of the image sensor 200. The lens 102 may be configured as an autofocus lens or an image stabilization lens. Description will be made below assuming that the lens 102 is configured as an autofocus lens.

The actuator 104 includes a coil 106. The actuator 104 positions the lens 102 according to the driving signal applied to the coil 106. In the present embodiment, the actuator 104 is configured as a moving-coil type voice coil motor. The coil 106 is arranged such that it is wound around the lens 102.

The position detection coil 204 is arranged such that it is magnetically coupled with the coil 106 of the actuator 104, i.e., such that a magnetic field (magnetic flux) 5 generated by the coil 106 functions as an interlinkage with the position detection coil 204. Preferably, the position detection coil 204 is arranged such that it surrounds the pixel array 202 so as not to interfere with the incident light 3.

The actuator driver 300 supplies a pulse-shaped driving signal $S_2$ to the coil 106 of the actuator 104, so as to control the position of the lens 102. The coil 106 generates a magnetic field 5 that corresponds to the driving signal $S_2$. Due to the magnetic field 5, an induced electromotive force $S_3$ occurs in the position detection coil 204.

The position detection circuit 208 generates a position detection signal $P_{FB}$ that indicates the position of the lens 102 based on the induced electromotive force $S_3$ that occurs in the position detection coil 204 according to the driving signal $S_2$, so as to feedback control the actuator driver 300. The actuator driver 300 receives the input of a position instruction signal $P_{REF}$ (target code) that indicates the target position of the lens 102. The position instruction signal $P_{REF}$ is generated by the image processing processor 4. The method for generating the position instruction signal $P_{REF}$ is not restricted in particular. For example, the position instruction signal $P_{REF}$ may be generated based on an output of an AF sensor embedded in (or provided as an external component of) the image acquisition face of the image sensor 200 (phase difference AF). Also, the position instruction signal $P_{REF}$ may be generated such that the contrast of an image acquired by the image sensor 200 becomes high (contrast AF).

The actuator driver 300 changes at least one from among the duty ratio, frequency, on time, and off time of the driving signal $S_2$ such that the position detection signal $P_{FB}$ thus fed back matches the position instruction signal $P_{REF}$. The modulation method for the driving signal $S_2$ is not restricted in particular. Examples of such a modulation method that can be employed include: Pulse Width Modulation (PWM) control, Pulse Frequency Modulation (PFM) control, Pulse Density Modulation (PDM) control, and delta-sigma modulation. Description will be made regarding an example employing the PWM control method in which the duty ratio (on time) is changed while maintaining the frequency (period) of the driving signal $S_2$.

Figure 2:
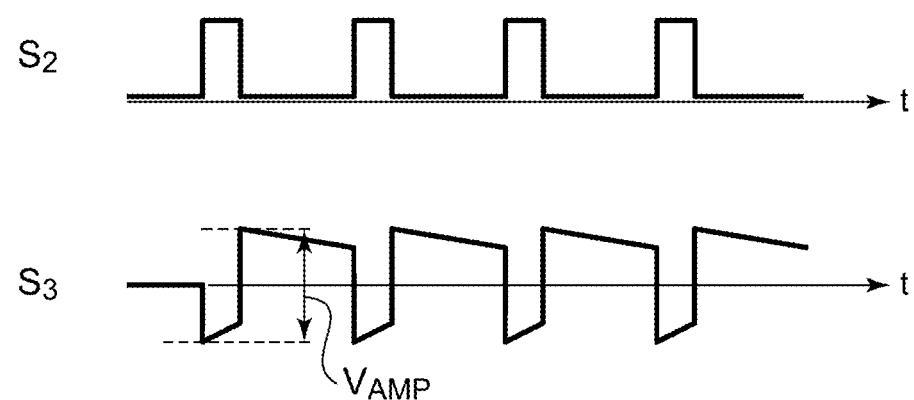
FIG. 2 is a waveform diagram showing the principle of position detection supported by the camera module shown in FIG. 1.

The above is the basic configuration of the camera module 100. Next, description will be made regarding the operation thereof. FIG. 2 is a waveform diagram for explaining the principle of the position detection supported by the camera module 100 shown in FIG. 1. In the present specification, the vertical axis and the horizontal axis shown in the waveform diagrams and the time charts in the present specification are expanded or reduced as appropriate for ease of understanding. Also, each waveform shown in the drawing is simplified for ease of understanding or exaggerated for emphasis.

FIG. 2 shows the driving signal $S_2$ and the induced electromotive force $S_3$, each configured as a pulse-shaped signal. As the coil 106 becomes closer to the position detection coil 204, the coupling coefficient between them becomes larger, thereby raising the strength (amplitude) $V_{AMP}$ of the induced electromotive force $S_3$. Conversely, as the coil 106 becomes farther from the position detection coil 204, the coupling coefficient between them becomes smaller, thereby lowering the strength (amplitude) $V_{AMP}$ of the induced electromotive force $S_3$. That is to say, the induced electromotive force $S_3$ changes according to the distance between the coil 106 and the position detection coil 204. The position detection coil 204 is fixed. Accordingly, the amplitude $V_{AMP}$ of the induced electromotive force $S_3$ has a correspondence with the position of the coil 106, i.e., the position of the lens 102.

Figure 3:
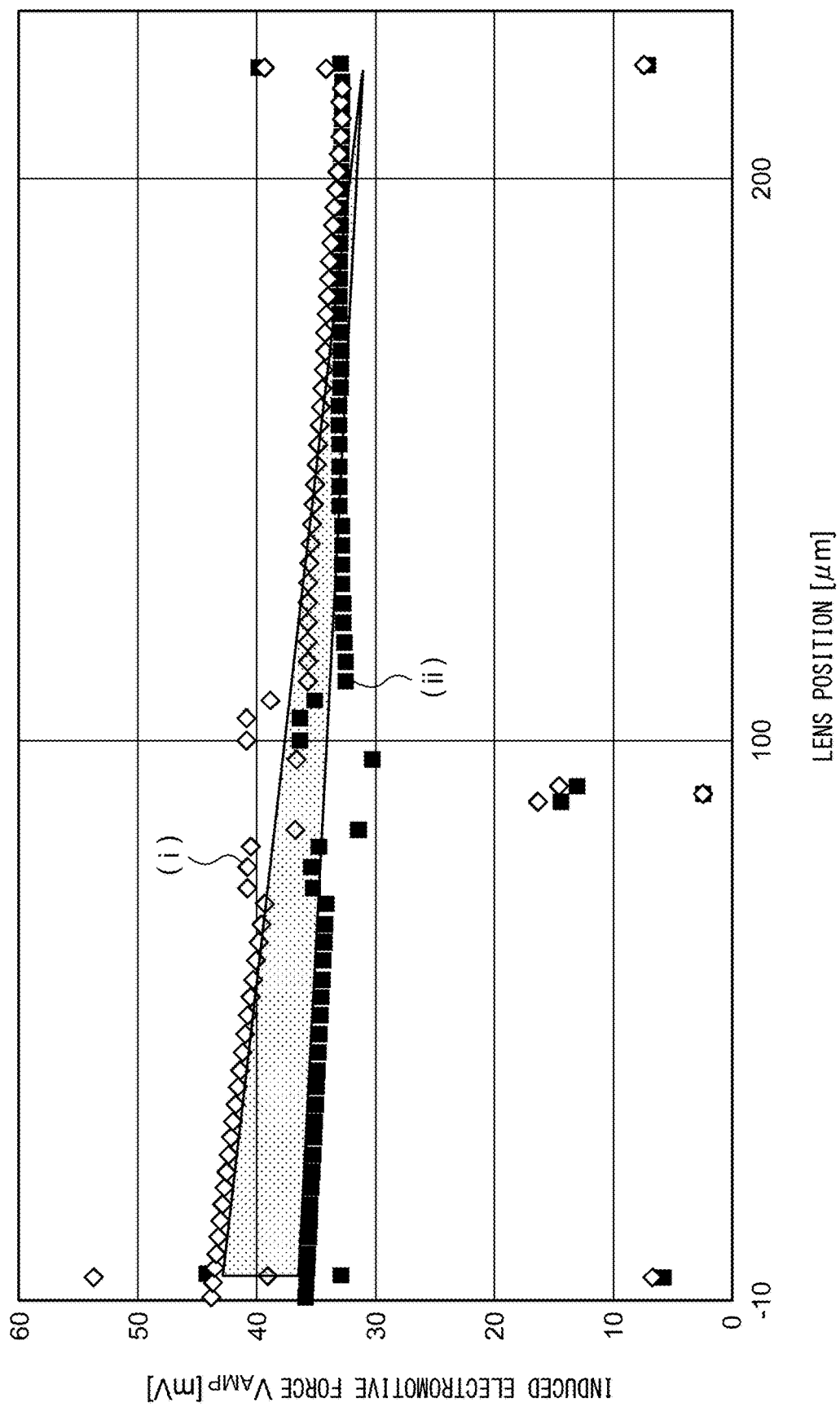
FIG. 3 is a diagram showing the relation between the lens position and the induced electromotive force.

FIG. 3 is a diagram showing the relation between the lens position and the induced electromotive force. In FIG. 3, (i) indicates a measurement result in a case in which the lens is displaced, and (ii) indicates a measurement result in a case in which the lens is fixed. The difference between the characteristics (i) and (ii) becomes a factor that depends on the lens position. In a case in which the relation shown in FIG. 3 is estimated by simulation or is measured beforehand, such an arrangement is capable of generating the position detection signal $P_{FB}$ based on the induced electromotive force $S_3$.

The above is the operation of the camera module 100. With such a camera module 100, the lens position can be detected without using a Hall element. This allows the camera module 100 to be configured with a reduced cost and/or with a reduced size. Furthermore, such an arrangement employing the induced electromotive force is resistant to the effects of the fluctuation of the temperature or individual variation as compared with an arrangement employing a Hall element, thereby allowing high-precision position detection.

Furthermore, the coil 106 configured as a pulse-driven component is also used as a magnetic field generating unit. Accordingly, such an arrangement does not require an additional magnetic field generating unit (e.g., a permanent magnet or a magnetic field generating coil and a driver thereof) provided on the mover side. This allows the mover to have a simple configuration. Such a simple configuration of the mover also contributes to size reduction and cost reduction of the camera module 100.

Returning to FIG. 1, the camera module 100 may have the following features.

When the actuator 104 is pulse driven in an image acquisition period (exposure period) for capturing a still image, in some cases, an AC component of the driving signal $S_2$ supplied to the coil 106 of the actuator 104 is input to the image sensor 200 as radiation noise, leading to degraded image quality.

In order to solve such a problem, the image sensor 200 is configured to be capable of supplying a transition permission signal $S_4$, which indicates whether the transition of the driving signal $S_2$ (edge generation) is to be permitted or prohibited, to the actuator driver 300 in synchronization with the internal operation and processing thereof. Using the transition permission signal $S_4$, the actuator driver 300 is notified of a period from a pixel reading sequence mainly supported as an internal operation of the image sensor 200 that does not involve degradation in the image quality regardless of whether or not radiation noise is input. In a case in which the transmission permission signal $S_4$ is applied to the driving signal $S_2$, such an arrangement allows the actuator driver 300 to PWM drive the coil 106 without involving degradation in the image quality. It should be noted that description will be made in the present embodiment with reference to an example in which the high level of the transition permission signal $S_4$ is assigned to the "permission", and the low level thereof is assigned to the "prohibition". However, the present invention is not restricted to such an example.

The present disclosure encompasses various kinds of apparatuses, circuits, and methods that can be regarded as a block configuration shown in FIG. 1, or otherwise that can be derived from the aforementioned description. That is to say, the present disclosure is not restricted to a specific configuration. More specific description will be made below regarding example configurations or examples for clarification and ease of understanding of the essence of the present disclosure and the circuit operation. That is to say, the following description will by no means be intended to restrict the technical scope of the present disclosure.

Figure 4A:
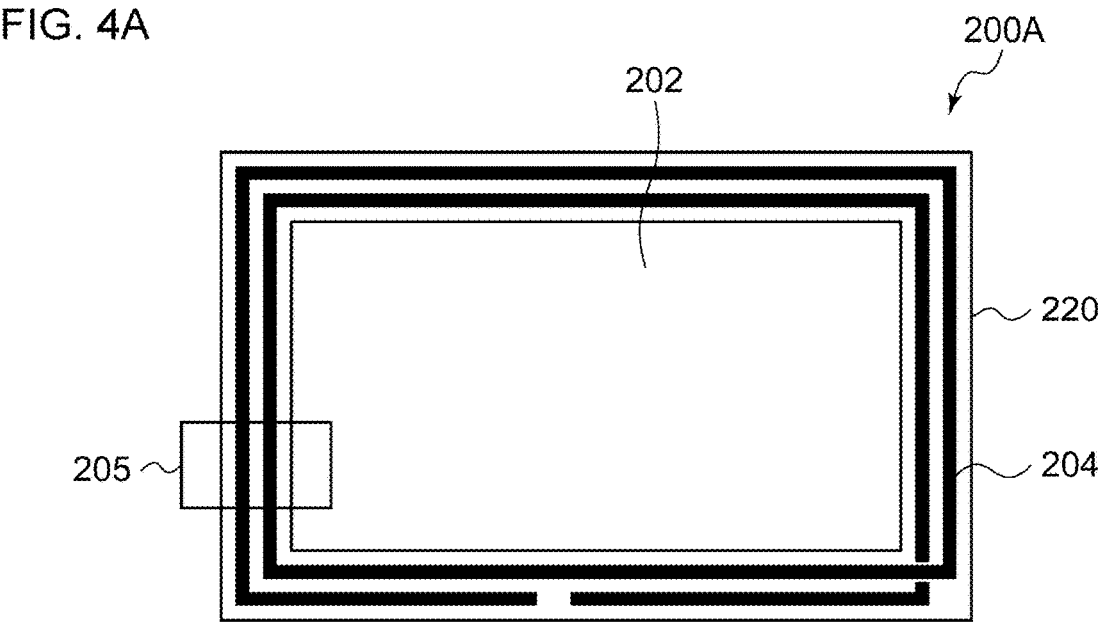
FIGS. 4A and 4B are a plan view and a perspective view each showing an image sensor that can be employed in the camera module shown in FIG. 1.
Figure 4B:
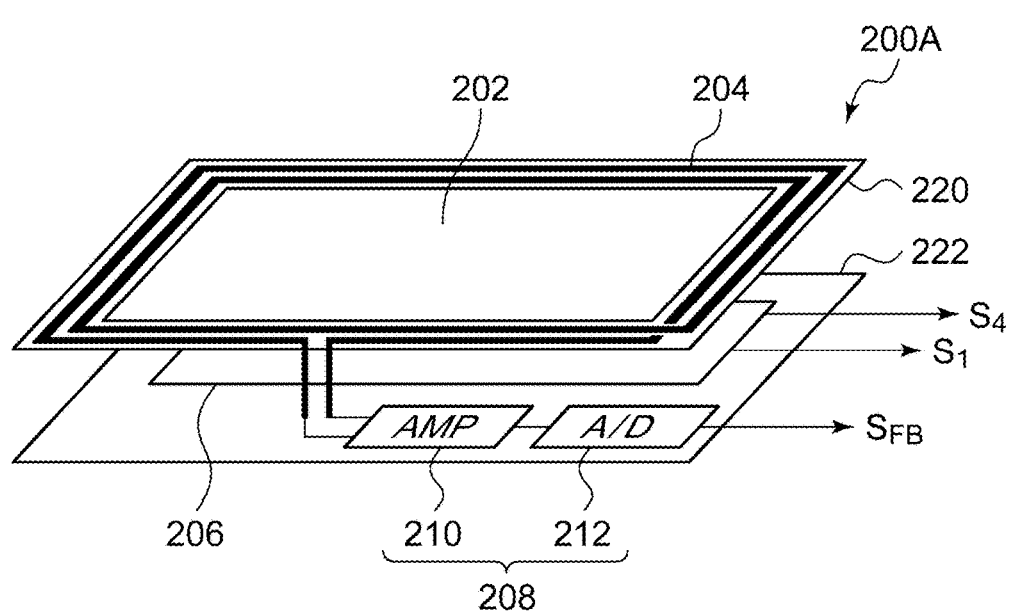

FIGS. 4A and 4B are respectively a plan view and a perspective view each showing an image sensor 200A that can be employed in the camera module 100 shown in FIG. 1. In this example configuration, the position detection coil 204 is built into the image sensor 200.

In a case in which the position detection coil 204 is configured as an external component of the image sensor 200, such an arrangement has the potential to involve a change in the position relation between the image acquisition face of the pixel array 202 and the position detection coil 204. Accordingly, such an arrangement requires high-precision alignment in the manufacturing stage. Furthermore, such an arrangement requires calibration. In a case in which the position detection coil 204 is built into the image sensor 200, the position relation between the image acquisition face and the position detection coil 204 is fixed. This allows high-precision position detection. Furthermore, this allows the work volume to be reduced in the manufacturing process. Such an advantage is equal to or greater than an advantage of a reduced number of components.

In particular, in a case in which such an example configuration is applied to an autofocus lens configured to control the distance between the image acquisition face and the lens 102, this advantage becomes marked. This is because the distance between the position detection coil 204 and the coil 106 is measured based on the induced electromotive force. In this case, the relative position relation between the position detection coil 204 and the image acquisition face is fixed. Accordingly, such an arrangement allows high-precision measurement of the distance between the image acquisition face and the coil 106.

The image sensor 200 includes a first chip (die) 220 and a second chip 222, and has a structure in which they are stacked. The method for electrically coupling the first chip 220 and the second chip 222 is not restricted in particular. A three-dimensional Large Scale Integrated (LSI) circuit architecture is employed. Electrodes formed on the bottom face of the first chip 220 may be coupled to the corresponding electrodes formed on the upper face of the second chip 222. Alternatively, multiple pads may be formed along the peripheral portion of each of the first chip 220 and the second chip 222. Furthermore, each pad may be coupled to a corresponding pad by wire bonding. Furthermore, the kind of the package for the image sensor 200 is not restricted in particular. Examples of such a package include a Chip Size Package (CSP), a Dual Inline Package (DIP), and a Ceramic Leaded Chip Carrier (CLCC) package.

The pixel array 202 is formed on the first chip 220 as a main component. The position detection coil 204 is integrated on the first chip 220. Specifically, the position detection coil 204 is formed in a region that surrounds an image acquisition area in which the pixel array 202 is formed. The position detection coil 204 may be formed using Monolithic Microwave Integrated Circuit (MMIC) technology. Specifically, the position detection coil 204 may be formed using an inductor element which is referred to as a "microstrip line" or a "strip line".

The number of turns of the position detection coil 204 may preferably be determined based on the inductance value required for the position detection coil 204. In a case in which a large inductance value is required, the position detection coil 204 may be configured with a multilayered structure, thereby allowing the number of turns to be increased.

Conventional image sensors have a redundant space region along the peripheral portion of the pixel array 202. An inductor element to be employed in a typical MMIC is required to have a reduced DC resistance. In contrast, with the position detection coil 204, the DC resistance does not become a problem to that extent. Accordingly, this allows the position detection coil 204 to have a narrow width. This allows such a redundant space region provided in a conventional image sensor to be employed as a region in which such an inductor element is formed. That is to say, realistically, this does not require a large chip size to form such an appropriate inductor element. In other words, it can be said that such an arrangement involves substantially no increase in costs in order to integrate the position detection coil 204 on the first chip 220.

A readout control circuit 206 is integrated on the second chip 222. The readout control circuit 206 controls the multiple pixels 201 of the pixel array 202, so as to read out the pixel values from the multiple pixels 201. The readout control circuit 206 may include a readout unit including a sense amplifier or an A/D converter and a logic circuit or memory configured to control the columns or rows to be read out. The configuration of the readout control circuit 206 and the control sequence may be designed using known techniques. Accordingly, detailed description thereof will be omitted.

The transition permission signal $S_4$ described above may be generated by the readout control circuit 206. That is to say, the control sequence supported by the readout control circuit 206 has a period in which degradation does not occur in the image quality even if radiation noise is input. Specifically, radiation noise has a large effect on a sense period in which the pixel values are amplified and sampled and held. In contrast, it can be said that radiation noise has less effect on other periods.

For example, the readout control circuit 206 may read out the pixel values by correlated double sampling. In the correlated double sampling, the following four periods are repeated.

Reset period $T_{RESET}$
P-phase (Pre-charge Phase) period $T_P$
Exposure (light receiving) period $T_{EXP}$
D-phase (Data phase) period $T_D$ In the reset period $T_{RESET}$, the charge stored in each pixel 201 is reset. In the following P-phase period $T_P$, a signal $V_{RESET}$ that corresponds to the amount of charge after the reset is read out. In the following exposure period $T_{EXP}$, charge is stored in each pixel corresponding to the amount of incident light. In the following D-phase period $T_D$, a signal $V_{SIG}$ that corresponds to the amount of charge stored in each pixel is read out. The difference between the two signals $V_{RESET}$ and $V_{SIG}$ thus acquired is employed as the pixel value for each pixel.

The readout control circuit 206 sets the transition permission signal $S_4$ to the low level so as to prohibit the transition of the driving signal $S_2$ during the P-phase period $T_P$ and the D-phase period $T_D$. In other periods, the readout control circuit 206 sets the transition permission signal $S_4$ to the high level so as to permit the transition of the driving signal $S_2$.

In addition to the readout control circuit 206, the position detection circuit 208 is also integrated on the second chip 222. The position detection circuit 208 includes an amplifier 210 and an A/D converter 212, for example. The amplifier 210 amplifies the weak induced electromotive force $S_3$ that occurs in the position detection coil 204. The A/D converter 212 converts the signal thus amplified into a digital position detection signal $P_{FB}$.

It should be noted that the A/D converter 212 may be omitted. In this case, an analog signal thus amplified may be output as the position detection signal $P_{FB}$. Also, the actuator driver 300 may convert the analog position detection signal $P_{FB}$ into a digital position detection signal $P_{FB}$.

The induced electromotive force $S_3$ has a very small amplitude $V_{AMP}$. Accordingly, the induced electromotive force $S_3$ is easily affected by noise. In order to solve such a problem, at least an amplifier component of the position detection circuit 208 is built into the image sensor 200A. This allows the distance of a line for transmitting such a weak signal to be reduced, thereby reducing the noise effects. As shown in FIG. 4B, in a case in which, after the induced electromotive force $S_3$ is converted into a digital signal, the digital signal thus converted is transmitted to the actuator driver 300, such an arrangement allows the noise effects to be further reduced.

Figure 5A:
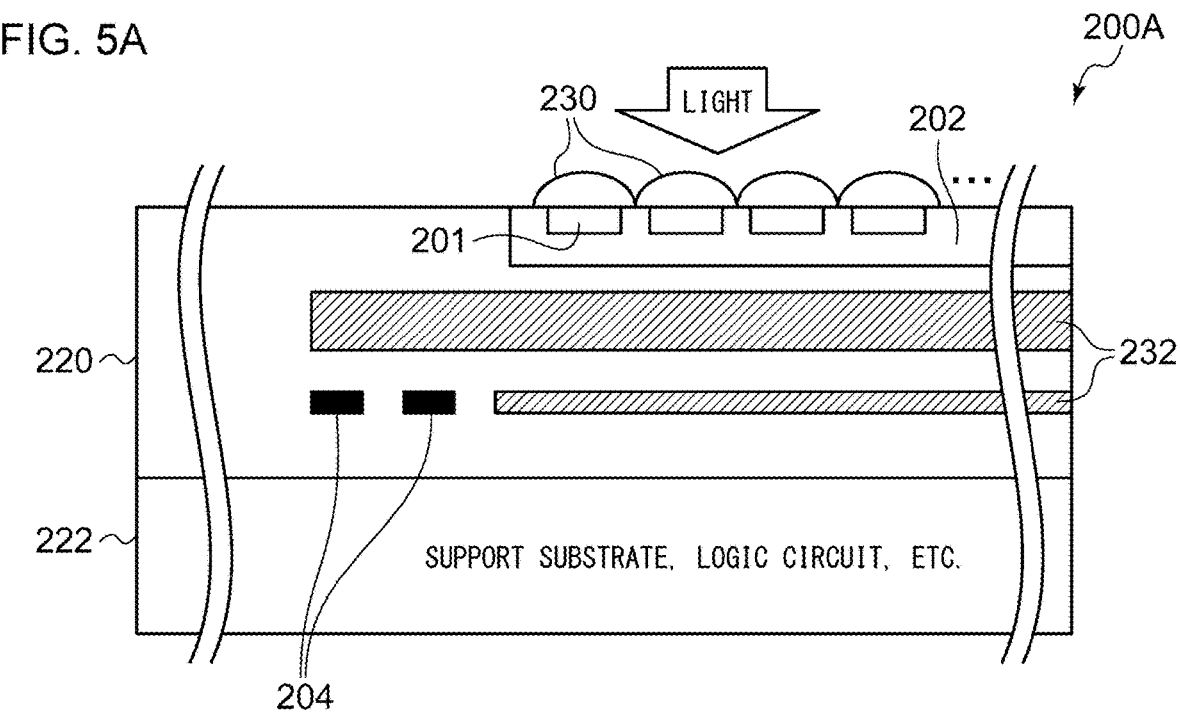
FIGS. 5A and 5B are each a partial cross-sectional diagram showing a portion of the image sensor surrounded by the broken line shown in FIG. 4A.
Figure 5B:
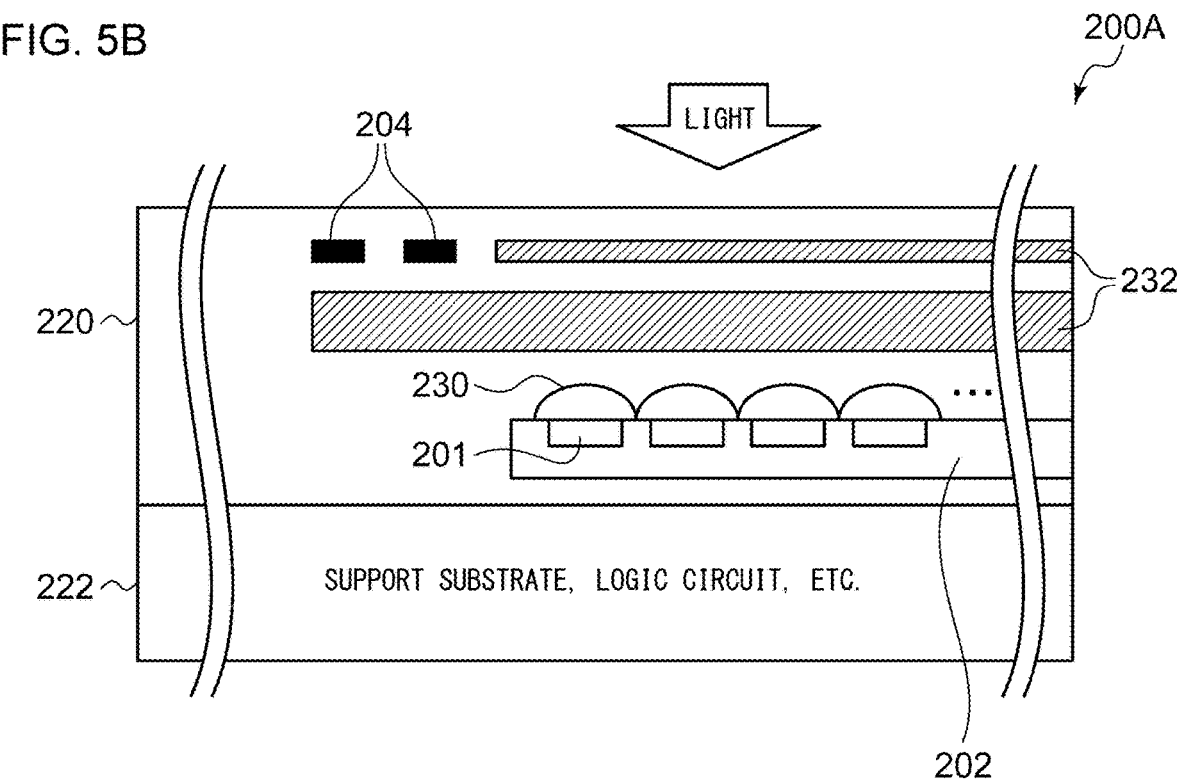

FIGS. 5A and 5B are partial cross-sectional diagrams each showing a portion of the image sensor 200A shown in FIG. 4A surrounded by the broken line 205. FIG. 5A shows a back-illuminated image sensor. A micro-lens array 230 is formed on the surface of the pixel array 202. Multiple wiring layers 232 are provided on the lower side of the pixels 201. The position detection coil 204 is formed using at least one wiring layer from among the multiple wiring layers 232.

FIG. 5B shows a front-illuminated image sensor. Multiple wiring layers 232 are provided on the upper side of the pixel array 202. The position detection coil 204 is formed using at least one wiring layer from among the multiple wiring layers 232.

Figure 6:
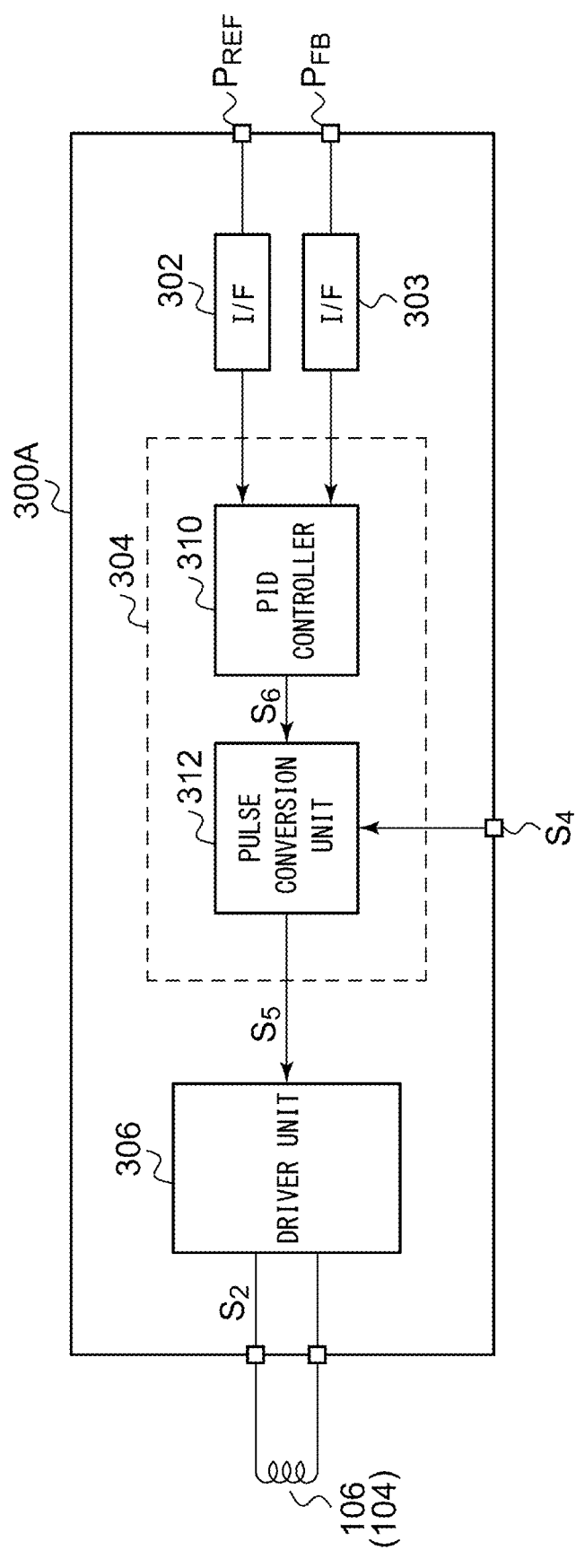
FIG. 6 is a circuit diagram showing an actuator driver that can be employed in combination with the image sensor shown in FIG. 5.

FIG. 6 is a circuit diagram showing an actuator driver 300A that can be employed as a combination with the image sensor 200A shown in FIG. 5. The actuator driver 300A is configured as a function IC integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

The interface circuit 302 receives the position instruction signal $P_{REF}$ that indicates the target position of the lens 102 from the processor. Furthermore, the interface circuit 303 receives the position detection signal $P_{FB}$ generated by the position detection circuit 208. The interface circuit 302 or 303 may be configured using an Inter IC ($I^2C$) interface, Universal Asynchronous Receiver Transmitter (UART) interface, or the like. However, the present disclosure is not restricted to such an arrangement.

The controller 304 generates a control pulse $S_5$ having a duty ratio controlled such that the position detection signal $P_{FB}$ approaches the position instruction signal $P_{REF}$. For example, the controller 304 includes a PID controller 310 and a pulse conversion circuit 312.

The PID controller 310 detects the difference $\Delta P$ between the position instruction signal $P_{REF}$ and the position detection signal $P_{FB}$, and executes PID (proportional-integral-differential) calculation on the difference $\Delta P$, so as to generate a control instruction value $S_6$. It should be noted that, instead of the PID control, PI control, P control, or nonlinear control may be employed. Here, the control instruction value $S_6$ represents a duty instruction value.

The pulse conversion circuit 312 converts the control instruction value $S_6$ generated by the PID controller 310 into the control pulse $S_5$. For example, the pulse conversion circuit 312 may generate the control pulse $S_5$ that is set to the high level during the on time indicated by the control instruction value $S_6$ for one cycle of the control pulse $S_5$, and that is set to the low level during the remaining period. For example, the pulse conversion circuit 312 may be configured as a digital counter.

In order to suppress degradation in the image quality, the controller 304 may receive the transition permission signal $S_4$. With such an arrangement, the controller 304 switches the control pulse $S_5$ only during a period in which the transmission permission signal $S_4$ is set to the high level (transition permission).

Figure 7:
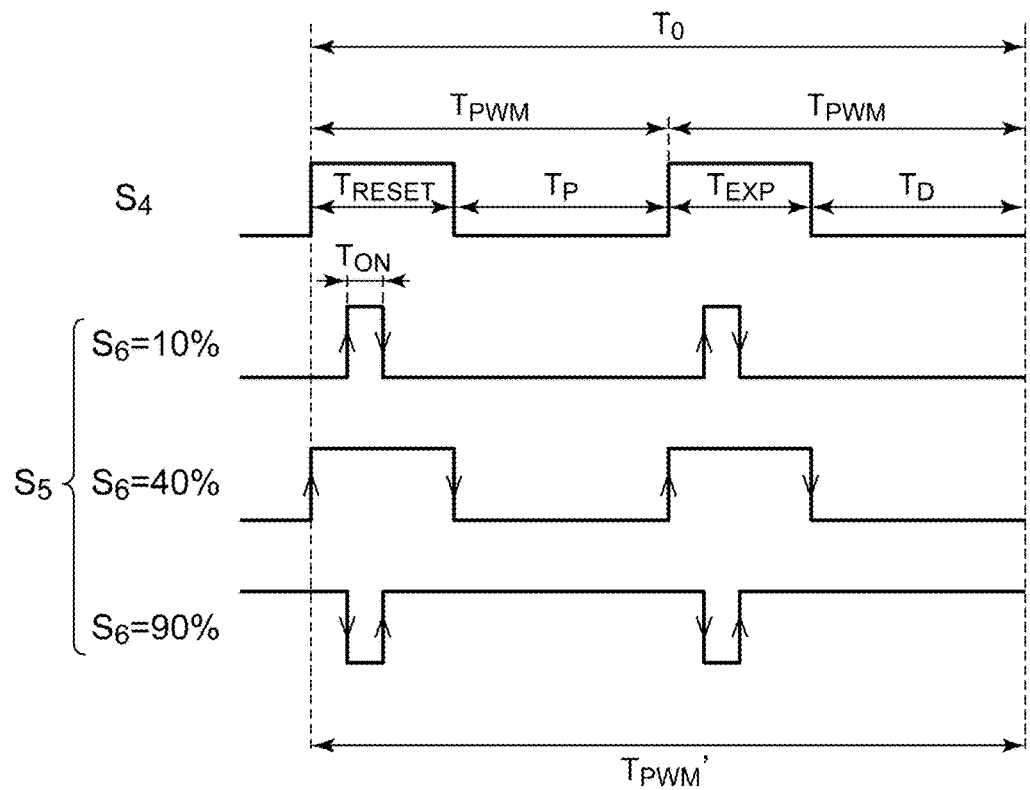
FIG. 7 is a waveform diagram showing an example of a transition permission signal $S_4$ and control pulses $S_5$ that correspond to different control instruction values $S_6$ (different duty ratios).

FIG. 7 is a waveform diagram showing an example of a transition permission signal $S_4$ and control pulses $S_5$ that correspond to different control instruction values $S_6$ (different duty ratios). Here, $T_0$ represents one cycle of the readout operation supported by the readout control circuit 206. Furthermore, $T_{RESET}$, $T_P$, $T_{EXP}$, and $T_D$ represent the reset period, P-phase period, exposure period, and D-phase period described above, respectively.

In a period in which the transition permission signal $S_4$ is set to the high level, the controller 304 controls the control pulse $S_5$ such that the high level length (on time) approaches a value indicated by the control instruction signal $S_6$ while scheduling the occurrence of a positive edge and a negative edge of the control pulse $S_5$.

In the example shown in FIG. 7, one cycle $T_0$ of the readout operation supported by the readout control circuit 206 includes two PWM periods $T_{PWM}$. With such an arrangement, the control instruction value $S_6$ is updated for each PWM period $T_{PWM}$.

Also, one cycle $T_0$ of the readout processing may be designed to be equal to the PWM period $T_{PWM}'$. In this case, this can be regarded as an arrangement in which the control pulse $S_5$ includes multiple sub-pulses in each PWM period $T_{PWM}'$. The readout control circuit 206 may change, according to the control instruction value $S_6$, the total time $T_{ON}$ that represents the sum total of the on times (high-level periods) of the multiple sub-pulses.

The method or algorithm for generating the control pulse $S_5$ based on the control instruction value $S_6$ and the transition permission signal $S_4$ is not restricted in particular. As the simplest method, $T_P$ and $T_D$ are set such that they are the same and $T_{RESET}$ and $T_{EXP}$ are set such that they are the same. Under this condition, a ratio represented by $T_{RESET}/(T_{RESET}+T_P)\times100(\%)$ is employed as a threshold value $DR_{TH}$ of the duty ratio. In the example shown in FIG. 7, the threshold value $DR_{TH}$ is 40%. With such an arrangement, when the duty instruction value indicated by the control instruction value $S_6$ is smaller than $DR_{TH}$, each on time $T_{ON}$ of the control pulse $S_5$ may preferably be set in a high-level period of the transition permission signal $S_4$. Conversely, when the duty instruction value indicated by the control instruction value $S_6$ is larger than $DR_{TH}$, each on time $T_{ON}$ of the control pulse $S_5$ may preferably be set in a low-level period of the transition permission signal $S_4$.

In a case in which $T_{RESET}/(T_{RESET}+T_P) \neq T_{EXP}/(T_{EXP}+T_D)$, different duty-ratio thresholds $DR_{TH}$ may preferably be set for the first-half PWM period and the second-half PWM period.

Also, the PWM period $T_{PWM}'$ may be larger than each readout period $T_0$. In this case, each control pulse $S_5$ may be designed such that a positive edge thereof occurs in the reset period $T_{RESET}$, and a negative edge thereof occurs in the exposure period $T_{EXP}$.

The driver unit 306 applies the pulse-shaped driving signal $S_2$ that corresponds to the control pulse $S_5$ thus generated to the coil 106 of the actuator 104.

The actuator driver 300A shown in FIG. 6 is capable of controlling the position of the lens 102 with high precision in cooperation with the image sensor 200A shown in FIG. 4. Furthermore, such an arrangement is capable of preventing the image quality from degrading due to the radiation noise involved in the PWM driving operation.

Figure 8:
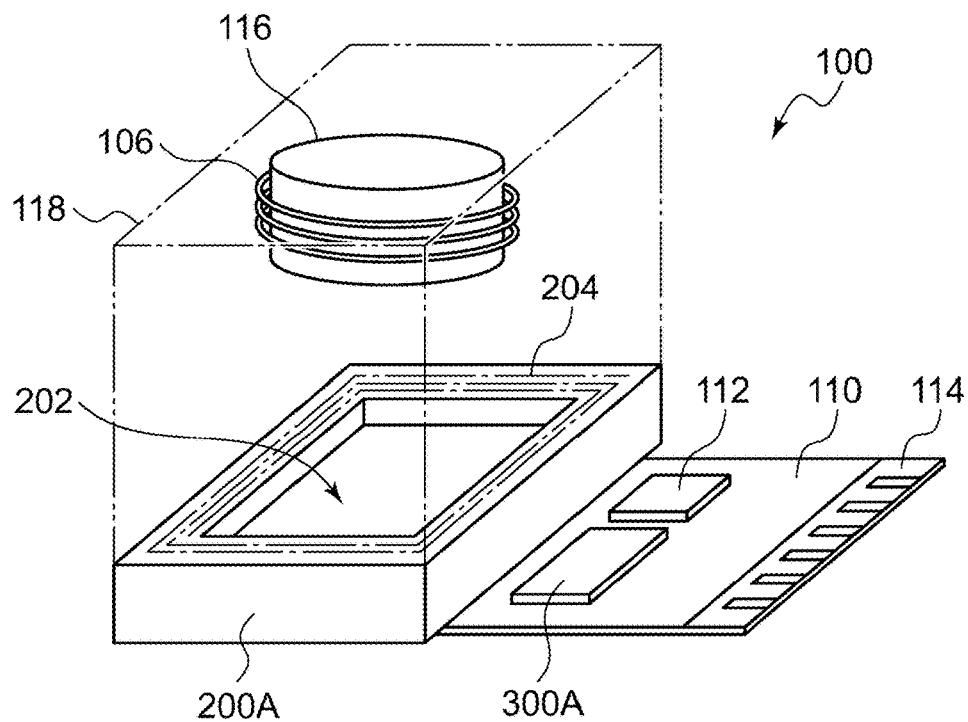
FIG. 8 is a layout diagram showing a camera module including the image sensor shown in FIG. 4 and the actuator driver shown in FIG. 6.

FIG. 8 is a layout diagram showing the camera module 100 including the image sensor 200A shown in FIG. 4 and the actuator driver 300A shown in FIG. 6.

The lens 102 is housed within a lens barrel 116. The lens barrel 116 is provided with the coil 106 configured as a component of the actuator 104. The lens barrel 116 is covered by a housing 118. Within the housing 118, a permanent magnet (not shown) configured as a component of the actuator 104 together with the coil 106 is included.

The image sensor 200A and the actuator driver 300A are mounted on a flexible substrate 110 together with Electrically Erasable Programmable Read-Only Memory (EEPROM) 112. A connector 114 is provided at an end of the flexible substrate 110, which allows it to be coupled to a printed circuit board (not shown) included in the electronic device 2. The EEPROM 112 stores calibration information, control parameters to be used for the actuator driver 300A and the image sensor 200A, etc., in a nonvolatile manner.

Figure 9:
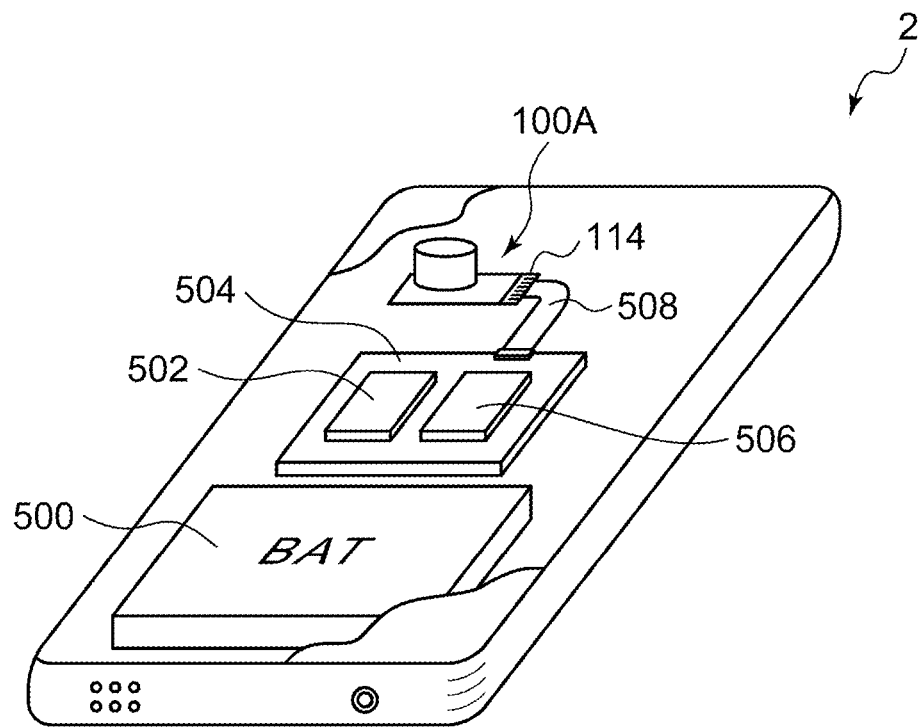
FIG. 9 is a perspective view showing an electronic device including a camera module.

FIG. 9 is a perspective diagram showing the electronic device 2 including the camera module 100. Examples of such an electronic device 2 include smartphones, tablet PCs, digital still cameras, etc. However, the present disclosure is not restricted to such examples. The electronic device 2 shown in FIG. 9 is configured as a smartphone. In addition to the camera module 100, the electronic device 2 includes a battery 500, a power supply circuit 502, a printed circuit board 504, an application processor 506, a cable 508, and the like. In addition, the electronic device 2 mounts a liquid crystal panel, an audio IC, and the like, which are not shown.

The power supply circuit 502 and the application processor 506 are mounted on the printed circuit board 504. The application processor 506 is configured as a Central Processing Unit (CPU) that integrally controls the electronic device 2, which corresponds to the processor 4 for image processing described above. The connector 114 of the camera module 100 is coupled to the printed circuit board 504 via the cable 508.

By employing the camera module 100 according to the present embodiment, this provides a high-precision autofocus function. Furthermore, this allows the camera module 100 to be configured with a reduced cost and a reduced size. Accordingly, this arrangement contributes to allowing the electronic device 2 to be configured with a reduced cost and a reduced size.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

First Modification

Figure 10:
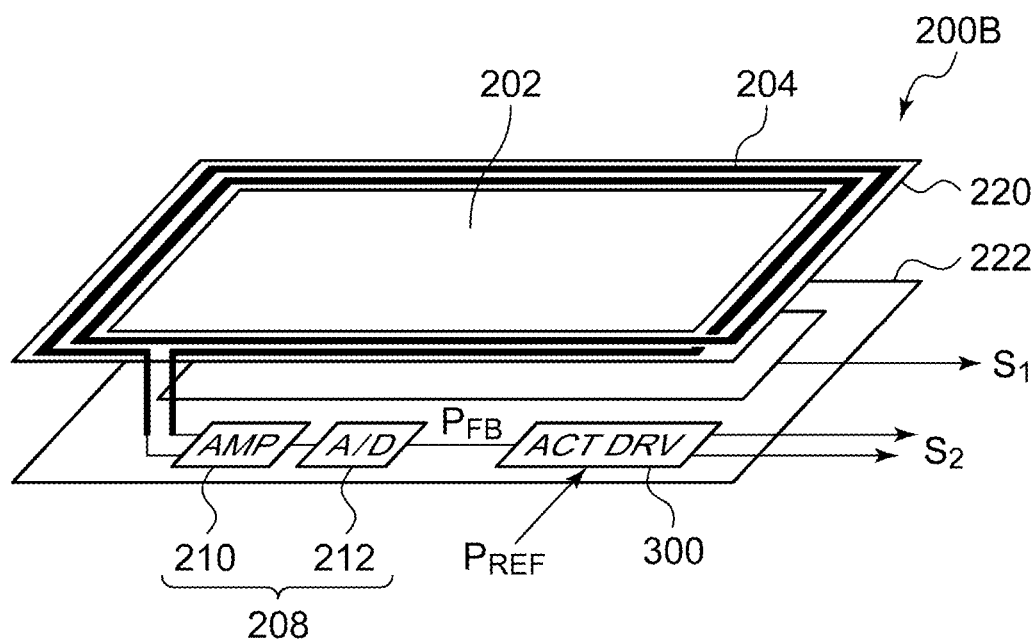
FIG. 10 is a perspective view showing an image sensor according to a first modification.

FIG. 10 is a perspective diagram showing an image sensor 200B according to a first modification. In this modification, the image sensor 200B includes an actuator driver 300B as a built-in component. Specifically, the actuator driver 300B is integrated on the second chip 222 of the image sensor 200B.

With a combination of the image sensor 200A shown in FIG. 4 and the actuator driver 300A shown in FIG. 6, such an arrangement requires wiring external to the IC for routing the transition permission signal $S_4$ and the position detection signal $P_{FB}$. In contrast, with the image sensor 200B shown in FIG. 10, such an arrangement does not require such external wiring for such signals. Furthermore, this arrangement does not require the interface circuit 303 shown in FIG. 6.

Second Modification

Figure 11:
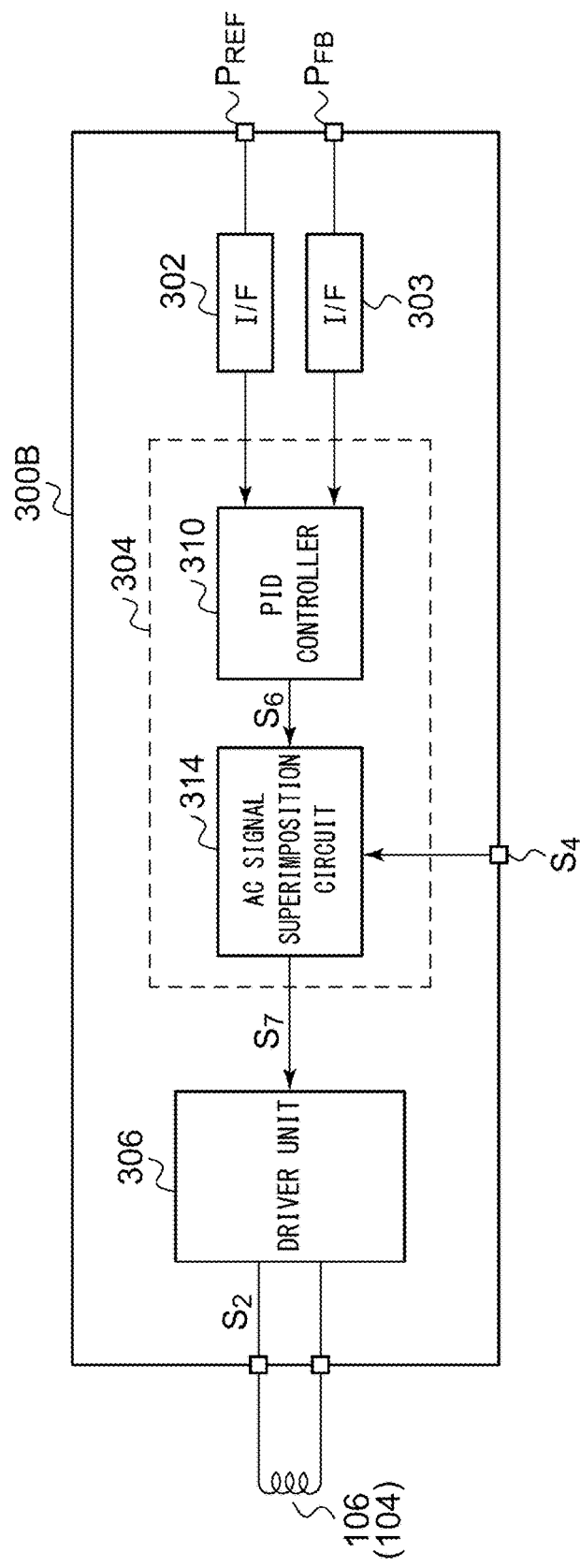
FIG. 11 is a block diagram showing an actuator driver according to a second modification.

The usage of the image sensor 200A shown in FIG. 4 is not restricted to the camera module 100 shown in FIG. 1. For example, the image sensor 200A may be used together with the actuator driver 300B configured to linearly drive the coil 106. FIG. 11 is a block diagram showing an actuator driver 300B according to a second modification. The controller 304 includes an AC signal superimposition circuit 314. The AC signal superimposition circuit 314 superimposes an AC signal on the control instruction value $S_6$. The AC signal may be configured as a pulse signal (rectangular signal). Also, the AC signal may be configured as a sine wave, quasi-sine wave, triangle wave, trapezoidal wave, sawtooth wave, or the like. The AC signal may preferably be designed so as to have an effect on the position control operation for the lens. Accordingly, the AC signal may preferably be designed to have a signal component that is smaller than that for supporting the linear driving operation.

The control instruction signal $S_7$ including the AC signal thus superimposed is input to the driver 306B. The driver 306B converts the digital control instruction signal $S_7$ into the analog driving signal $S_2$, and supplies the analog driving signal $S_2$ to the coil 106. The coil 106 generates a magnetic field due to the AC signal thus superimposed. Accordingly, due to the magnetic field thus generated, an induced electromotive force occurs in the position detection coil 204 of the image sensor 200A. Based on the transition permission signal $S_4$, the AC signal superimposition circuit 314 may control a timing at which an edge occurs in the pulse-shaped AC signal.

With the modification shown in FIG. 11, after the control instruction signal $S_6$ is converted into an analog signal, the analog AC signal may be superimposed on the analog control instruction signal thus converted.

It should be noted that a control operation (autofocus locking operation) is known in which positioning control of the lens is not allowed in still image capturing (in a readout sequence). In a case in which the actuator is linearly driven, such an arrangement does not require the lens position information during the image capturing, thereby requiring no superimposition of an AC signal. Such an arrangement does not involve degradation in the image quality due to radiation noise. Accordingly, in this case, the transmission permission signal $S_4$ is supported as an optional function.

Third Modification

With another modification of the camera module 100 employing the image sensor 200A, in addition to the coil 106, a magnetic field generation coil may be provided to the movable portion of the actuator 104. The AC signal may be applied to the magnetic field generation coil.

Fourth Modification

With the camera module 100 shown in FIG. 1, a desired configuration element may be integrated with a desired configuration element. Also, such desired configuration elements may be configured as a module. Conversely, a block to be handled as a single configuration element may be divided into multiple physically separate blocks.

Fifth Modification

Description has been made in the embodiment regarding an arrangement in which the position detection coil 204 is arranged such that it surrounds the pixel array 202. However, the present disclosure is not restricted to such an arrangement. Also, the position detection coil 204 may be configured to have a size that is smaller than that of the pixel array 202.

Sixth Modification

Description has been made in the embodiment regarding the camera module 100 configured as an image acquisition apparatus. However, the camera module 100 is not necessarily configured as a module. Also, the camera module 100 may be configured as an image sensor with a lens.

What is claimed is:

1. An image sensor comprising:
    a pixel array comprising a plurality of pixels arranged in an image acquisition area;
    a position detection coil arranged in an area that surrounds the image acquisition area; and
    a readout control circuit structured to control the plurality of pixels, and to read out pixel values from the plurality of pixels, wherein a lens is provided on an optical path of incident light to the image sensor, wherein an induced electromotive force occurs in the position detection coil according to a magnetic field generated by a coil of an actuator structured to support positioning of the lens, wherein the actuator is pulse drive, and wherein the readout control circuit generates a transmission permission signal that indicates whether transition of a pulse-shaped driving signal to be supplied to the coil of the actuator is to be permitted or prohibited, wherein the pixel array and the position detection coil are integrated on a first chip, and wherein the readout control circuit is integrated on a second chip having an upper face on which the first chip is mounted.

2. The image sensor according to claim 1, wherein the lens is configured as an autofocus lens.

3. The image sensor according to claim 1, further comprising an actuator driver structured to pulse drive the actuator such that a position detection signal that indicates a position of the lens matches a position instruction signal that indicates a target position of the lens, wherein the actuator driver controls the pulse-shaped driving signal to be supplied to the actuator such that a transition occurs in the driving signal in a period in which the transmission permission signal indicates the permission for signal transition.

4. The image sensor according to claim 2, further comprising a position detection circuit structured to generate a position detection signal that indicates a position of the lens based on the induced electromotive force that occurs in the position detection coil.

5. A camera module comprising an image sensor comprising:

a pixel array comprising a plurality of pixels;

a lens provided on an optical path of incident light to the image sensor;

an actuator comprising a coil, and structured to support positioning of the lens according to a driving signal applied to the coil;

a position detection coil arranged such that it magnetically couples with the coil of the actuator;

an actuator driver structured to supply the pulse-shaped driving signal to the coil of the actuator; and a position detection circuit structured to generate a position detection signal that indicates a position of the lens based on an induced electromotive force that occurs in the position detection coil according to the driving signal, and to feed back the position detection signal to the actuator driver, wherein the position detection coil is built into the image sensor.

6. The camera module according to claim 5, wherein the image sensor supplies a transition permission signal that indicates whether transition of the driving signal is to be permitted or prohibited, in synchronization with an internal operation.

7. An electronic device comprising the camera module according to claim 5.

8. An actuator driver structured to drive an actuator structured to support positioning of a lens provided on an optical path of incident light to an image sensor, the actuator driver comprising:

an interface circuit structured to receive a position instruction signal that indicates a target position of the lens;

a controller structured to generate a control pulse with at least one variable property from among a duty ratio, frequency, on time, and off time, which is changed such that the position instruction signal matches a position detection signal obtained based on an induced electromotive force that occurs in a position detection coil arranged such that it magnetically couples with a coil included in the actuator; and a driver unit structured to drive the actuator based on the control pulse, wherein the position detection coil is built into the image sensor.

9. The actuator driver according to claim 8, wherein the controller is structured to receive, from the image sensor, a transition permission signal that indicates whether transition of the control pulse is to be permitted or prohibited, and to apply the transition permission signal to the control pulse.

* * * * *